United States Patent
Gyarmati et al.

(10) Patent No.: US 11,619,296 B2
(45) Date of Patent: Apr. 4, 2023

(54) TRANSMISSION FOR A MOTOR VEHICLE (71) Applicant: ZF Friedrichshafen AG, Friedrichshafen (DE)

(72) Inventors: Tamas Gyarmati, Bermatingen (DE); Thorsten Müller, Friedrichshafen (DE); Stephan Stroph, Tettnang (DE); Carl Schilling, Weingarten (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 90 days.

(21) Appl. No.: 16/953,486

(22) Filed: Nov. 20, 2020

(65) Prior Publication Data
US 2021/0156465 A1    May 27, 2021

(30) Foreign Application Priority Data

Nov. 21, 2019   (DE) .................. 10 2019 217 982.7

(51) Int. Cl.
*F16H 57/04*    (2010.01)
*F01M 11/06*    (2006.01)

(52) U.S. Cl.
CPC ....... *F16H 57/0443* (2013.01); *F01M 11/064* (2013.01); *F01M 11/065* (2013.01); *F16H 57/045* (2013.01); *F16H 57/0408* (2013.01); *F16H 57/0421* (2013.01)

(58) Field of Classification Search
CPC ............ F16H 57/0421; F16H 57/0443; F01M 11/064; F01M 11/065; F01M 2011/0041
See application file for complete search history.

(56) References Cited

U.S. PATENT DOCUMENTS 2,938,601 A * 5/1960 Brafford .............. F01M 11/065
184/6.2
4,366,724 A * 1/1983 Yamamori ............ F16H 57/037
475/160

(Continued)

FOREIGN PATENT DOCUMENTS

DE          19912327 A1      9/2000
DE     102012010181 A1 *  11/2012   ......... F16H 57/0445

(Continued)

OTHER PUBLICATIONS

German Search Report DE102019217982.7, dated Jun. 17, 2020. (10 pages).

Primary Examiner — Minh Truong
(74) Attorney, Agent, or Firm — Dority & Manning, P.A.

(57) ABSTRACT

A transmission for a motor vehicle includes a housing and a gear set. An oil drainage channel is formed by the housing and/or by an element connected to the housing and is arranged spatially underneath the gear set. The oil drainage channel includes at least one gear set-side inlet port, a closed underside, and an oil sump-side outlet port at one end of the oil drainage channel, which are designed and arranged in such that oil from the gear set enters the oil drainage channel through the at least one inlet port and is guided along the closed underside to the outlet port. A suction port of a hydraulic unit of the transmission is arranged in the oil sump spatially underneath the closed underside of the oil drainage channel and axially offset with respect to the outlet port.

13 Claims, 5 Drawing Sheets (56) References Cited

U.S. PATENT DOCUMENTS

| | | | |
|---|---|---|---|
| 5,937,817 A * | 8/1999 | Schanz | F16H 57/04 |
| | | | 123/196 R |
| 9,567,880 B2 * | 2/2017 | Shieh | F01M 11/0004 |
| 10,208,850 B1 * | 2/2019 | Patel | F16H 57/0424 |
| 10,634,234 B2 | 4/2020 | Schilling | |
| 10,865,671 B2 * | 12/2020 | Shieh | F01M 11/0004 |
| 2009/0107769 A1 * | 4/2009 | Sato | B60K 6/365 |
| | | | 184/106 |

FOREIGN PATENT DOCUMENTS

| | | | |
|---|---|---|---|
| DE | 102014204088 A1 | 9/2015 | |
| DE | 102016217242 A1 | 3/2018 | |
| JP | 2009150502 A * | 7/2009 | F16H 57/0404 |

\* cited by examiner

TRANSMISSION FOR A MOTOR VEHICLE

CROSS-REFERENCE TO RELATED APPLICATION

The present application is related and has right of priority to German Patent Application No. 102019217982.7 filed on Nov. 21, 2019, which is incorporated by reference in its entirety for all purposes.

FIELD OF THE INVENTION

The invention relates generally to a transmission for a motor vehicle, and to a motor vehicle including such a transmission.

BACKGROUND

A transmission is described in DE 10 2016 217 242 A1. A housing of this transmission encloses a cavity, and an oil pan is connected to the housing. In the exemplary embodiment according to FIG. 3 of the aforementioned patent application, a separating element is provided, which separates the cavity from a further cavity associated with the oil pan. A passage between these two cavities, and a suction port of the transmission hydraulic system are arranged in a common plane.

SUMMARY OF THE INVENTION

Example aspects of the invention further develop the transmission known from the prior art.

In example embodiments, a transmission for a motor vehicle is provided. The transmission includes a housing and a gear set enclosed by the housing. The gear set is configured for making different transmission ratios available between an input shaft and an output shaft of the transmission. The gear set can be formed, for example, by multiple spur gear trains and/or by planetary gear sets. The transmission includes a hydraulic system, which supplies oil to the gear set for lubrication. Lube oil supplied to the gear set collects in an oil sump of the transmission due to gravity. The hydraulic system includes a pump, which scavenges oil out of the oil sump and supplies the oil to the gear set and, if necessary, to further hydraulic consumers of the transmission.

An oil drainage channel is formed by the housing and/or by an element connected to the housing. The oil drainage channel is arranged spatially underneath the gear set and includes at least one gear set-side inlet port, a closed underside, and an oil sump-side outlet port at one end of the oil drainage channel. The oil drainage channel is arranged and designed such that oil from the gear set enters the drainage channel through the at least one inlet port and is guided along the closed underside of the oil drainage channel to the outlet port. A suction port of the hydraulic system arranged in the oil sump is arranged spatially underneath the closed underside of the oil drainage channel and axially offset with respect to the outlet port. The term "axial" relates to the axis of rotation of the transmission input shaft in this case.

Due to such an arrangement, it is ensured that no air enters the suction port even upon strong acceleration of the motor vehicle including such a transmission. This is the case because, due to the closed underside of the oil drainage channel, oil cannot flow, unobstructed, out of the oil sump into the gear set during an acceleration process, and so more oil remains in the oil sump.

Preferably, the at least one inlet port is arranged axially offset with respect to the outlet port. The term "axial" relates to the axis of rotation of the transmission input shaft in this case. As a result, oil from the gear set can enter the oil drainage channel along a short path, and so the hydraulic drag of rotating parts of the gear set is reduced.

Preferably, the oil drainage channel includes multiple inlet ports. As a result, the oil flow from the gear set into the oil drainage channel can be affected in a targeted manner.

Preferably, the oil drainage channel includes an outlet port at only one single end. As a result, oil cannot flow, unobstructed, from the oil sump into the gear set during certain operating conditions of the motor vehicle, and so more oil remains in the oil sump.

Preferably, the closed underside of the oil drainage channel is formed, at least partially or in sections, by the hydraulic unit, which is connected to the housing. As a result, the housing, which is usually manufactured by casting, is more easily manufactured.

According to one preferred example embodiment, the housing includes a housing wall, wherein the outlet port is arranged spatially directly under the housing wall. The housing wall can be arranged between the gear set and a cavity of the transmission positioned upstream from the gear set, wherein this upstream cavity is enclosed, at least partially or in sections, by the housing. This upstream cavity can accommodate, for example, an electric machine and/or a torque converter, wherein one or both of these elements can be coupled to the input shaft of the transmission. This cavity can be designed as a wet space, wherein oil flowing out of the cavity collects in the oil sump due to gravity. An opening can be provided in the housing wall, in order to ensure a pressure compensation between the gear set space and the aforementioned cavity.

Preferably, the transmission for a motor vehicle is provided with a drive train aligned in parallel to the direction of travel of the motor vehicle, and so the input shaft and the output shaft of the transmission are aligned in parallel to the direction of travel.

BRIEF DESCRIPTION OF THE DRAWINGS

One exemplary embodiment is described in detail in the following with reference to the figures. Wherein.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
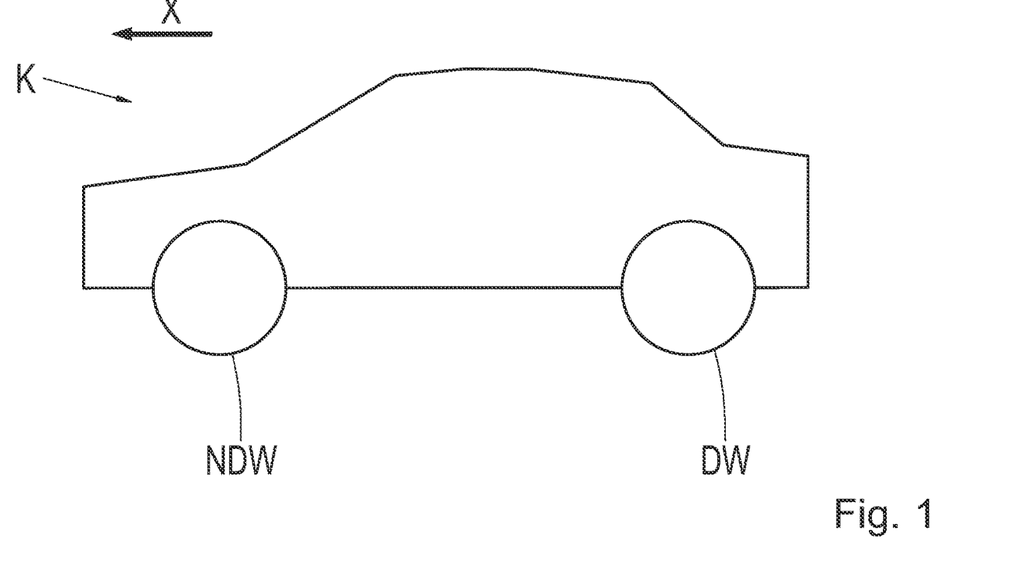
FIG. 1 shows a schematic of a motor vehicle.

FIG. 1 diagrammatically shows a motor vehicle K, wherein an arrow visualizes a preferred direction of travel X of the motor vehicle K. Front wheels NDW of the motor vehicle K are not driven; rear wheels DW of the motor vehicle K are driven.

Figure 2:
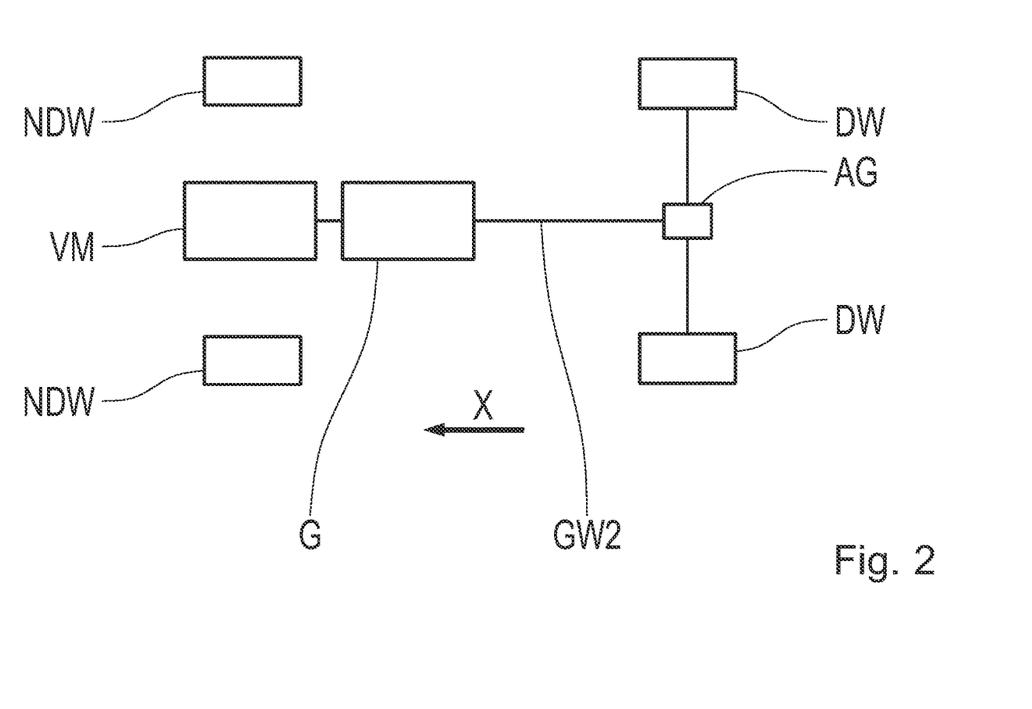
FIG. 2 shows a schematic of a drive train of the motor vehicle.

FIG. 2 diagrammatically shows a drive train of the motor vehicle K. An internal combustion engine VM is coupled to a transmission G. An output shaft GW2 of the transmission G is connected to a differential gear AG. With the aid of the differential gear AG, the torque of the output shaft GW2 is transferred to the rear wheels DW of the motor vehicle K. An arrow visualizes the preferred direction of travel X of the motor vehicle K.

Of course, the invention is not limited to a transmission G for such a drive train configuration. The transmission G could be utilized, for example, in an all-wheel drive train or in a drive train having front-wheel drive. Alternatively or additionally, the internal combustion engine VM and/or the transmission G could be arranged in the area of the vehicle rear axle, or even between the front axle and the rear axle.

Figure 3:
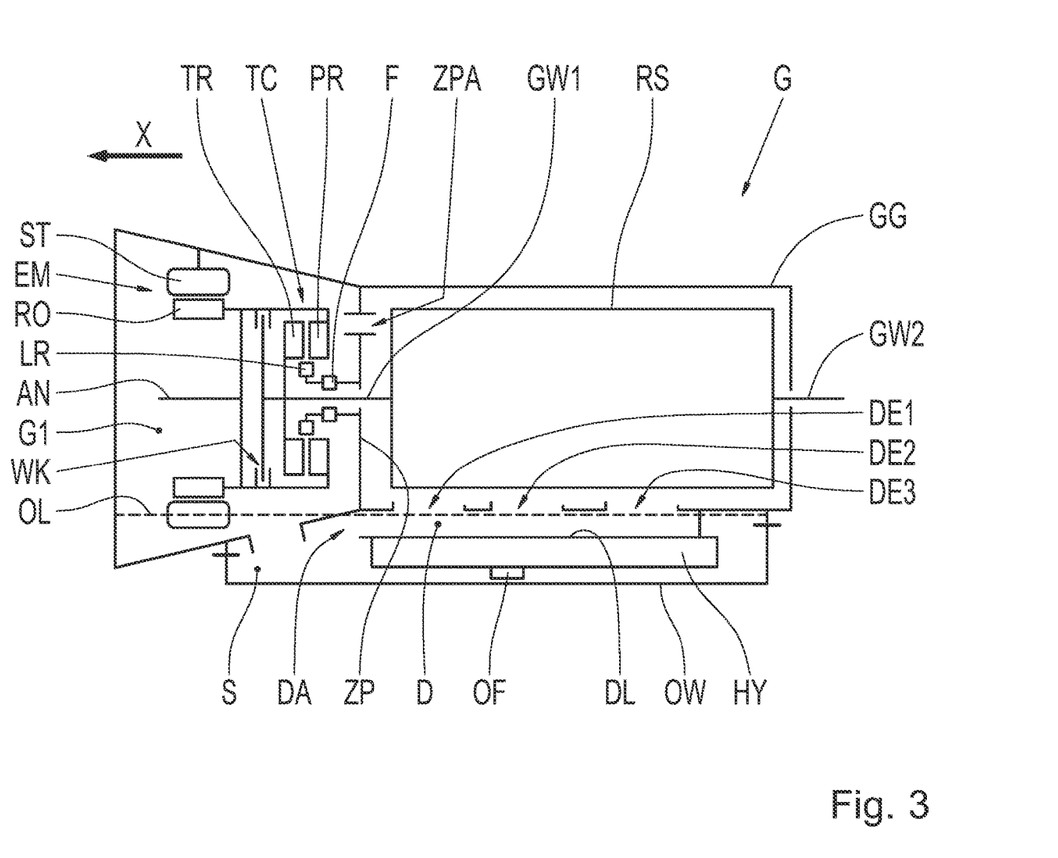
FIG. 3 through FIG. 6 each show a diagrammatic sectional view of a transmission of the motor vehicle.

FIG. 3 shows a diagrammatic sectional view of the transmission G. The transmission G includes a housing GG. The housing GG accommodates a gear set RS, which is merely diagrammatically represented in FIG. 3. With the gear set RS, different transmission ratios can be made available between an input shaft GW1 and the output shaft GW2. Planetary gear sets and/or spur gear trains, for example, can be utilized for this purpose. Oil is supplied to the gear set RS in order to lubricate elements of the gear set RS. The oil supply can take place, for example, through the input shaft GW1 and/or through the output shaft GW2, or even through oil ducts in the housing GG. The oil fed to the gear set RS in this way collects, due to gravity, in an oil sump S of the transmission G. The oil sump S is formed by a cavity, which is formed by the housing GG and by an oil pan OW attached at the housing GG. A hydraulic unit HY, for example, a hydraulic control unit and/or a hydraulic filter, is arranged in the oil sump S. The hydraulic unit HY includes a suction port OF. With the suction port OF, oil is scavenged out of the oil sump S and is fed to the gear set RS and, if necessary, to further hydraulic consumers of the transmission G. A hydraulic pump, which is not represented in FIG. 3, is provided for this purpose.

The housing GG includes a housing wall ZP. The housing wall ZP separates the gear set RS from a cavity G1 of the transmission G. The cavity G1 is delimited, at least partially or in sections, from the housing GG. A torque converter TC including an impeller PR, a turbine wheel TR, and a stator LR is arranged in the cavity G1. The impeller PR is connected to a connection shaft AN. A crankshaft of the internal combustion engine VM can be connected to the connection shaft AN, if necessary, by an interposed unit for reducing torsional vibrations (not represented in FIG. 3). The turbine wheel TR is connected to the input shaft GW1. The stator LR is supported at the housing wall ZP via a one-way clutch or freewheel unit F. The impeller PR, the turbine wheel TR, and the stator LR cooperate hydrodynamically in a known way. The turbine wheel TR and the impeller PR are mechanically connectable to one another with the aid of a torque converter lockup clutch WK. Instead of the torque converter TC, a dual clutch unit or a conventional launch clutch could be arranged in the cavity G1. Alternatively, one of the shift elements of the gear set RS can act as a starting component, and so the torque converter TC or another starting unit in the cavity G1 can be omitted.

Moreover, an electric machine EM including a stator ST and a rotor RO is arranged in the cavity G1. The stator ST is attached at the housing GG in a rotationally fixed manner. The rotor RO is connected to the connection shaft AN. This arrangement is to be considered merely as an example. Alternatively, the rotor RO could be connected to the input shaft GW1. The electric machine EM could also be entirely omitted.

The cavity G1 forms a wet space. Oil flowing out of the cavity G1 collects in the oil sump S due to gravity. An opening ZPA is provided in the housing wall ZP, in order to ensure a pressure compensation between the gear set space and the cavity G1.

The housing GG, together with the hydraulic unit HY attached at the housing GG, forms an oil drainage channel D underneath the gear set RS. The oil drainage channel D includes three inlet ports DE1, DE2, DE3, a closed underside DL, and an outlet port DA. The outlet port DA is arranged directly under the housing wall ZP and axially offset with respect to the inlet ports DE1, DE2, DE3. The suction port OF of the hydraulic unit HY is arranged spatially underneath the closed underside DL and axially offset with respect to the outlet port DA.

In FIG. 3, an oil level OL in the oil sump S is visualized. The oil level OL varies, of course, depending on the temperature of the oil and depending on the operating condition of the motor vehicle K including the transmission G. An oil level OL at a mean operating temperature of the oil and at a standstill of the motor vehicle K on an even surface is represented in FIG. 3, wherein the oil drainage channel D is at least partially filled with oil in this operating condition. If the motor vehicle K would be situated, for example, on a hillside, an oil level other than that represented in FIG. 3 would form, of course.

Figure 4:
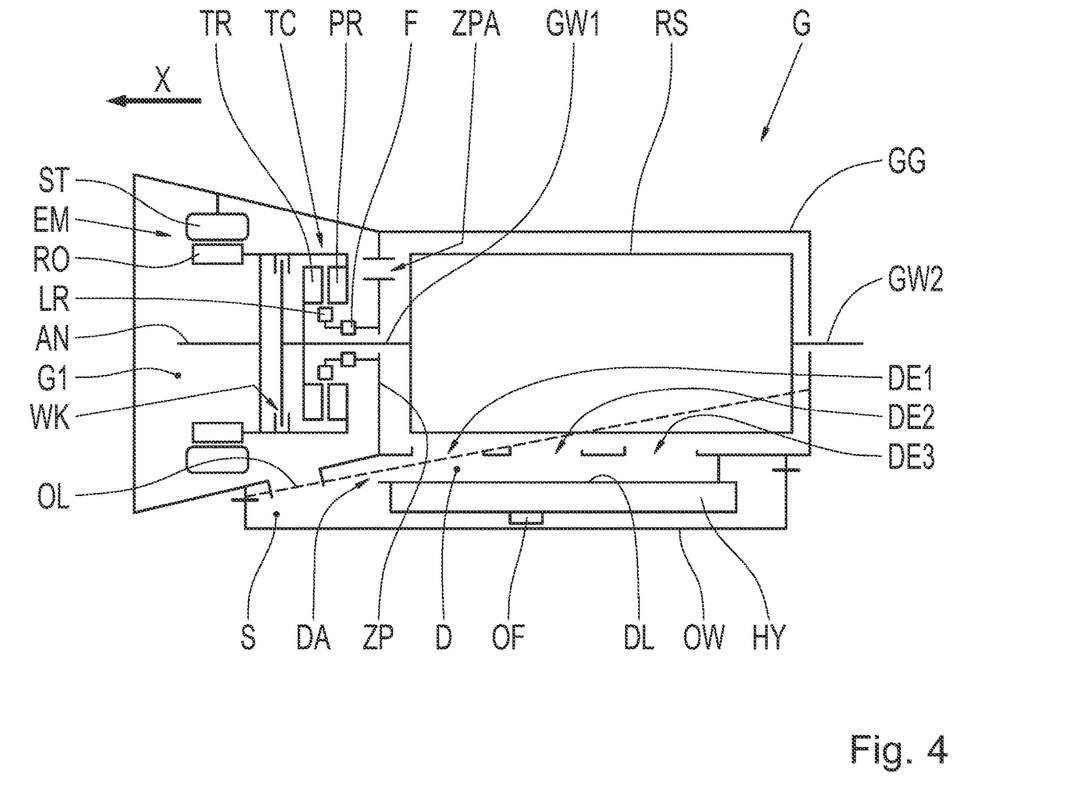

FIG. 4 shows a diagrammatic sectional view of the transmission G, which corresponds to the representation shown in FIG. 3. Therein, an oil level OL is represented that results at a moderate acceleration of the motor vehicle K in the direction X. In such an operating condition, oil from the oil sump S enters a rear section of the gear set RS via the oil drainage channel D. The suction port OF is located in oil in any case, and so no air is drawn in through the suction port OF.

Figure 5:
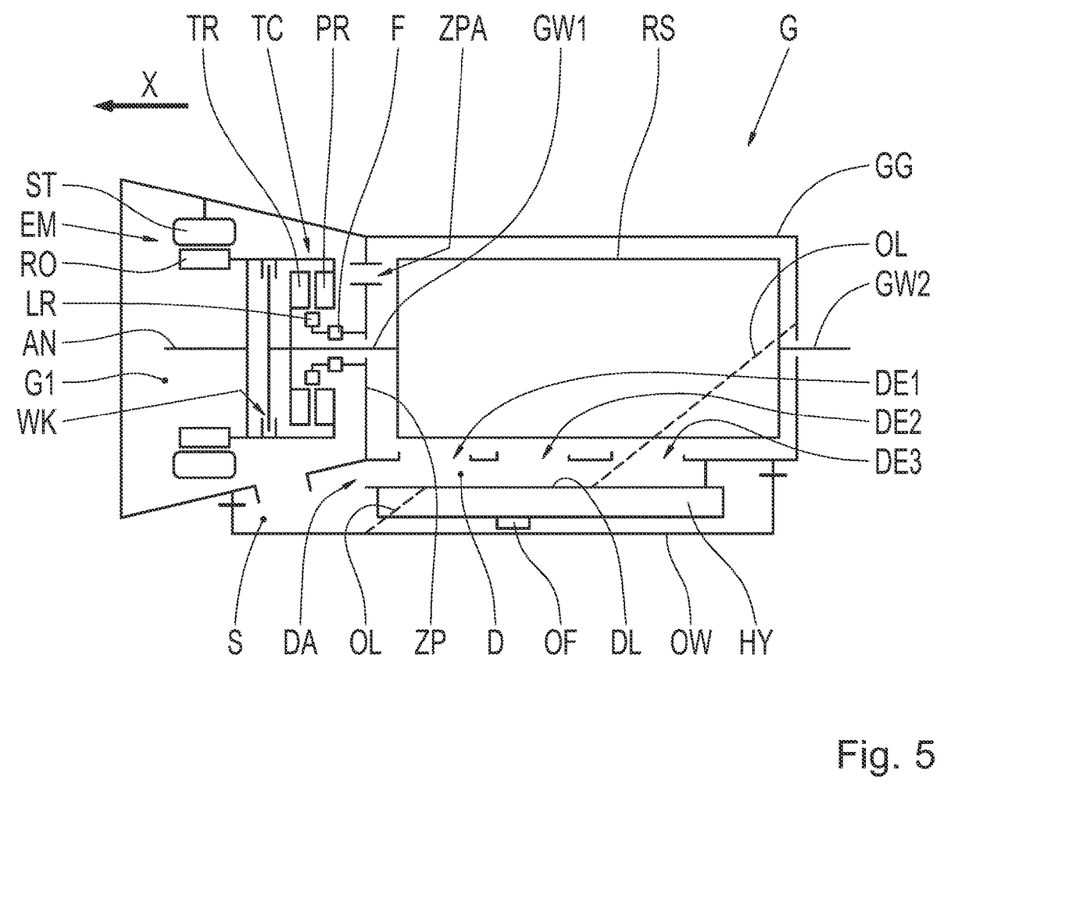

FIG. 5 shows a diagrammatic sectional view of the transmission G, which corresponds to the representation shown in FIG. 3. Therein, an oil level OL is represented that results at a strong acceleration of the motor vehicle K in the direction X. The acceleration in this case is stronger than in the operating condition shown in FIG. 4. In such an operating condition, no oil enters the gear set RS starting from the oil sump S due to the arrangement of the outlet port DA and the closed underside DL of the oil drainage channel D. The oil already located in the gear set RS at this point in time is therefore backed up in the rear area of the gear set RS. The suction port OF is located in oil in any case, and so no air is drawn in through the suction port OF.

For such a mode of operation, a complete seal between the rear gear set space and the rear area of the oil sump S is advantageous, but is not a precondition. If a complete seal is not possible, an oil flow from the rear area of the oil sump S into the rear gear set space can be decelerated, for example, with the aid of a labyrinth formation and an intentional reduction of the gap dimensions. This is generally sufficient, since such strong acceleration processes do not last for a long time period.

Figure 6:
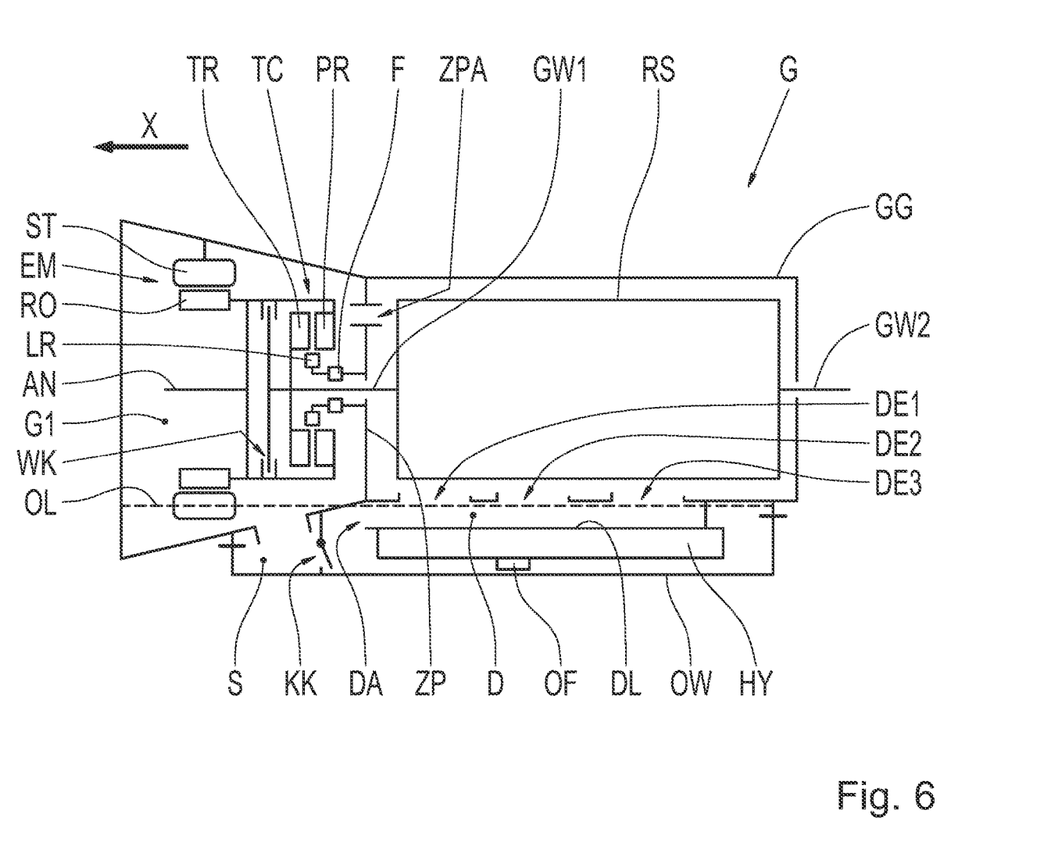

FIG. 6 shows a diagrammatic sectional view of the transmission G, which essentially corresponds to the representation shown in FIG. 3. A flap mechanism KK was added to the transmission G, which makes an oil flow out of the oil sump S into the cavity G1 difficult in the event of a strong braking procedure of the motor vehicle. With the aid of such a device, it can be ensured, even in the event of a strong deceleration of the motor vehicle K, that the suction port OF is located in oil in any case, so that no air is drawn in.

The proportions represented in the figures are utilized only for the purpose of illustration, and are not to be considered to be full scale.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

K motor vehicle
X preferred direction of travel
NDW front wheels
DW rear wheels
VM internal combustion engine
G transmission
AN connection shaft
GW1 input shaft
GW2 output shaft
AG differential gear
RS gear set
GG housing
G1 cavity
ZP housing wall
ZPA opening
S oil sump
OW oil pan
HY hydraulic unit
OF suction port
TC torque converter
PR impeller
TR turbine wheel
LR stator
F freewheel unit
WK torque converter lockup clutch
EM electric machine
ST stator
RO rotor
D oil drainage channel
DE1 inlet port
DE2 inlet port
DE3 inlet port
DL underside
DA outlet port
OL oil level
KK flap mechanism

The invention claimed is:
1. A transmission (G) for a motor vehicle (K), comprising:
a housing (GG);
a hydraulic unit (HY);
an input shaft (GW1) and an output shaft (GW2); and
a gear set (RS) enclosed by the housing (GG), the gear set (RS) configured for making different transmission ratios available between the input shaft (GW1) and the output shaft (GW2),
wherein oil for lubrication collects in an oil sump (S) of the transmission (G) due to gravity, and the oil is feedable to the gear set (RS),
wherein an oil drainage channel (D) is formed by the housing (GG) and/or by an element (HY) connected to the housing (GG), the oil drainage channel (D) is arranged underneath the gear set (RS), and the oil drainage channel (D) comprises
at least one gear set-side inlet port (DE1, DE2, DE3),
a fully closed underside (DL), and
a single oil sump-side outlet port (DA) at one end of the oil drainage channel (D),
wherein the at least inlet port (DE1, DE2, DE3), the fully closed underside (DL), and the single oil sump-side outlet port (DA) are configured and arranged such that oil from the gear set (RS) enters the oil drainage channel (D) through the at least one inlet port (DE1, DE2, DE3) and is guided along the fully closed underside (DL) to the outlet port (DA), and
wherein a suction port (OF) of the hydraulic unit (HY) is arranged in the oil sump (S) underneath the fully closed underside (DL) of the oil drainage channel (D) and axially offset with respect to the outlet port (DA).

2. The transmission (G) of claim 1, wherein the at least one inlet port (DE1, DE2, DE3) is arranged axially offset with respect to the outlet port (DA).

3. The transmission (G) of claim 1, wherein the at least one inlet port (DE1, DE2, DE3) is a plurality of inlet ports (DE1, DE2, DE3).

4. The transmission (G) of claim 1, wherein the outlet port (DA) is the only outlet port for the oil drainage channel (D).

5. The transmission (G) of claim 1, wherein the closed underside of the oil drainage channel (DL) is at least partially formed by the hydraulic unit (HY), and the hydraulic unit (HY) is connected to the housing (GG).

6. The transmission (G) of claim 1, wherein the housing (GG) comprises a housing wall (ZP), and the outlet port (DA) is arranged directly under the housing wall (ZP).

7. The transmission (G) of claim 6, wherein the housing wall (ZP) is arranged between the gear set (RS) and a cavity (G1) of the transmission (G) positioned upstream from the gear set (RS), and the cavity (G1) is at least partially enclosed by the housing (GG).

8. The transmission (G) of claim 7, further comprising an electric machine (EM) and/or a torque converter (TC) disposed within the cavity (G1).

9. The transmission (G) of claim 7, wherein the cavity (G1) is configured as a wet space, and oil flowing out of the cavity (G1) collects in the oil sump (S) due to gravity.

10. The transmission (G) of claim 7, wherein an opening (ZPA) is provided in the housing wall (ZP) for pressure compensation between the gear set (RS) and the cavity (G1).

11. The transmission (G) of claim 1, wherein the transmission (G) is configured for a motor vehicle (K) that comprises a drive train aligned in parallel to a direction of travel (X) of the motor vehicle (K), and the input shaft (GW1) and the output shaft (GW2) are aligned in parallel to the direction of travel (X).

12. A motor vehicle (K) comprising the transmission (G) of claim 1.

13. The transmission (G) of claim 1, wherein an opposite end of the oil drainage channel (D) is spaced from the one end of oil drainage channel (D) with the single oil sump-side outlet port (DA), and the opposite end of the oil drainage channel (D) is closed.

\* \* \* \* \*